United States Patent
Charrat et al.

(10) Patent No.: US 9,311,591 B2
(45) Date of Patent: Apr. 12, 2016

(54) ANTENNA SYSTEM FOR CONTACTLESS MICROCIRCUIT

(71) Applicant: INSIDE SECURE, Meyreuil (FR)

(72) Inventors: Bruno Charrat, Aix en Provence (FR); Pierre Pic, Ceyreste (FR)

(73) Assignee: INSIDE SECURE, Aix-en-Provence (FR)

( * ) Notice: Subject to any disclaimer, the term of this patent is extended or adjusted under 35 U.S.C. 154(b) by 0 days.

(21) Appl. No.: 14/412,572

(22) PCT Filed: Jun. 26, 2013

(86) PCT No.: PCT/FR2013/051487
§ 371 (c)(1),
(2) Date: Jan. 2, 2015

(87) PCT Pub. No.: WO2014/006300
PCT Pub. Date: Jan. 9, 2014

(65) Prior Publication Data
US 2015/0154491 A1 Jun. 4, 2015

(30) Foreign Application Priority Data
Jul. 2, 2012 (FR) .................................... 12 01865

(51) Int. Cl.
*G06K 5/00* (2006.01)
*G06K 19/077* (2006.01)
*H01Q 7/00* (2006.01)

(52) U.S. Cl.
CPC .... *G06K 19/07783* (2013.01); *G06K 19/07745* (2013.01); *G06K 19/07756* (2013.01); *G06K 19/07775* (2013.01); *G06K 19/07794* (2013.01);
(Continued)

(58) Field of Classification Search
CPC ......... G06K 5/00; G06K 19/00; G06K 19/06; G06K 7/08; G06F 17/00; H04Q 5/22; G08B 13/14
USPC ......... 235/492, 380, 375, 487, 451; 340/10.1, 340/572.7
See application file for complete search history.

(56) References Cited

U.S. PATENT DOCUMENTS 5,955,723 A 9/1999 Reiner
6,427,065 B1 * 7/2002 Suga et al. .................... 455/41.1
(Continued)

FOREIGN PATENT DOCUMENTS

EP 1 031 939 A1 8/2000
WO WO 02/11061 A1 2/2002

OTHER PUBLICATIONS

Sep. 4, 2013 International Search Report issued in International Patent Application No. PCT/FR2013/051487 (with translation).

*Primary Examiner* — Edwyn Labaze
(74) *Attorney, Agent, or Firm* — Oliff PLC

(57) ABSTRACT

The present invention relates to a method for manufacturing a microcircuit card, including steps of: forming a first antenna coil in a card, the first antenna coil having a part following the edge of the card, forming a module having a microcircuit and a second antenna coil around and connected to the microcircuit, and implanting the module into the card at a precise position in relation to the edge of the card, the first antenna coil being coupled by induction to the second antenna coil, the first antenna coil being pre-formed in such a way that only one part of the second antenna coil is at a distance from the first antenna coil of less than 5% of the width of the second antenna coil.

16 Claims, 6 Drawing Sheets

(52) U.S. Cl.
CPC ........... *H01Q 7/005* (2013.01); *Y10T 29/49018* (2015.01)

(56) References Cited

U.S. PATENT DOCUMENTS

| | | |
|---|---|---|
| 6,774,865 B1 | 8/2004 | Serra |
| 2002/0100810 A1* | 8/2002 | Amadeo ................ 235/492 |
| 2004/0263319 A1* | 12/2004 | Huomo ................ 340/10.2 |
| 2007/0194935 A1* | 8/2007 | Ayala et al. ............ 340/572.8 |
| 2008/0035741 A1* | 2/2008 | Sakama ................ 235/492 |
| 2010/0007567 A1* | 1/2010 | Hilgers ................ 343/741 |
| 2010/0134291 A1* | 6/2010 | Lavedas ................ 340/572.7 |
| 2011/0074645 A1* | 3/2011 | Rietzler et al. ............ 343/795 |
| 2012/0037710 A1* | 2/2012 | Le Garrec et al. ........ 235/492 |
| 2014/0167896 A1* | 6/2014 | Tung et al. ............ 336/5 |
| 2015/0097741 A1* | 4/2015 | Pachler et al. .......... 343/742 |

* cited by examiner

ANTENNA SYSTEM FOR CONTACTLESS MICROCIRCUIT

The present invention relates to contactless microcircuits or contactless integrated circuits, and in particular microcircuits integrated into an object such as a plastic card (polymer resin).

Contactless or near field communication NFC microcircuits have been developed to be able to perform transactions with a terminal, by inductive coupling or electric field coupling.

To make a communication by inductive coupling in particular, a sufficient inductive coupling factor must be obtained between an antenna coil of the terminal and an antenna coil connected to the microcircuit. This coupling factor depends on the respective sizes of the antenna coils of the terminal and of the microcircuit, and on the relative distance and positions of these two coils. The closer the size of the microcircuit coil is to that of the terminal, the higher the coupling factor between the two coils can be.

Generally, antenna coils of terminals have dimensions greater than those of a card in ISO 7816 format. It is thus desirable that the antenna coil of the microcircuit be as large as possible. However, the larger this coil is in relation to the microcircuit, the more difficult it is to produce a reliable connection between the coil and the microcircuit that is sufficiently strong to withstand frequent handling. In the case of contactless microcircuit cards, the cards are made of polymer resin, generally PVC (polyvinyl chloride), PET (polyethylene terephthalate), or PC (polycarbonate), and are thus deformable. It transpires that repeated deformations of the card can lead to the connection between the coil and the microcircuit breaking, which puts the microcircuit definitively out of service.

Figure 1:
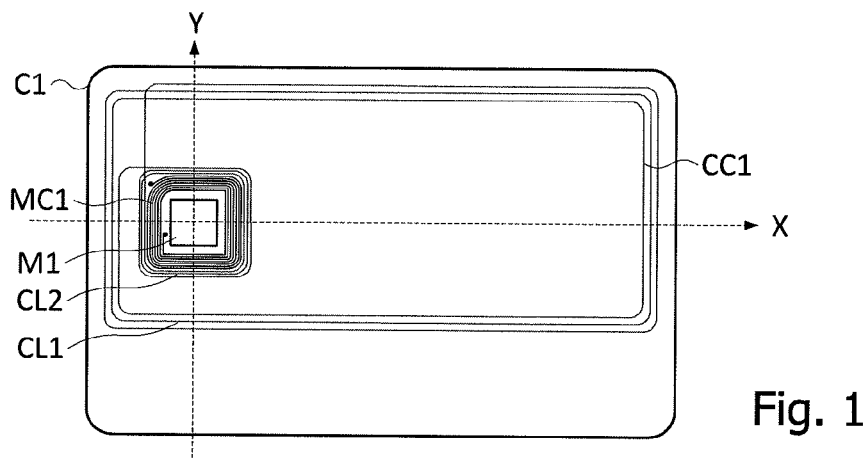

U.S. Pat. No. 5,955,723 suggests producing an inductive coupling between a large coil formed on the card, and a small coil connected to the microcircuit. The large coil comprises a small loop having substantially the dimensions of the coil of the microcircuit. The inductive coupling is made by making the center of the microcircuit coil coincide with that of the small loop. The quality of transmissions between these two antenna coils is measured by an inductive coupling factor. FIG. 1 represents such a microcircuit card C1. The microcircuit card C1 comprises an antenna coil CC1 and a microcircuit M1 connected to an antenna coil MC1. The antenna coils MC1 and CC1 comprise several turns. The antenna coil CC1 comprises a large loop having substantially the dimensions of the card C1 and a small loop CL1 having substantially the dimensions of the coil MC1.

Figure 1A:
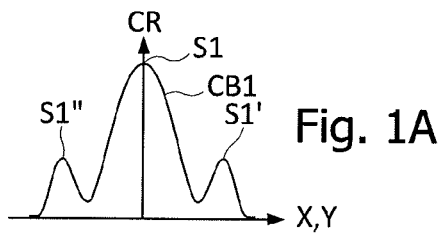

It transpires that the inductive coupling factor between the small loop of the large coil and the coil of the microcircuit is very sensitive to the accuracy of the alignment of the center of the small loop with that of the coil of the microcircuit. The slightest difference in this alignment results in a significant deterioration in this coupling factor. FIG. 1A represents a variation curve CB1 of this coupling factor CR according to the position of the coil MC1 in relation to the loop CL1 along a transverse X or longitudinal Y axis of the card, passing through the center of the loop CL1. The curve CB1 shows that when the coil MC1 is perfectly centered on the loop CL1, the coupling factor CR between the two coils MC1 and CC1 is maximum (at a main peak S1), and that when the coil MC1 is not centered on the loop CL1, this factor falls significantly and rapidly. The curve CB1 also has secondary peaks S1', S1" appearing when the coil MC1 is fully outside the loop CL2, but with a part (horizontal or vertical on FIG. 1A) opposite the loop.

Figure 2:
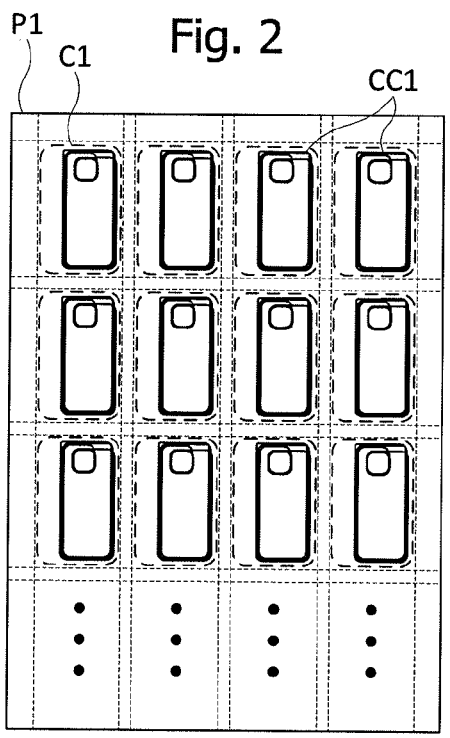
Figure 3:
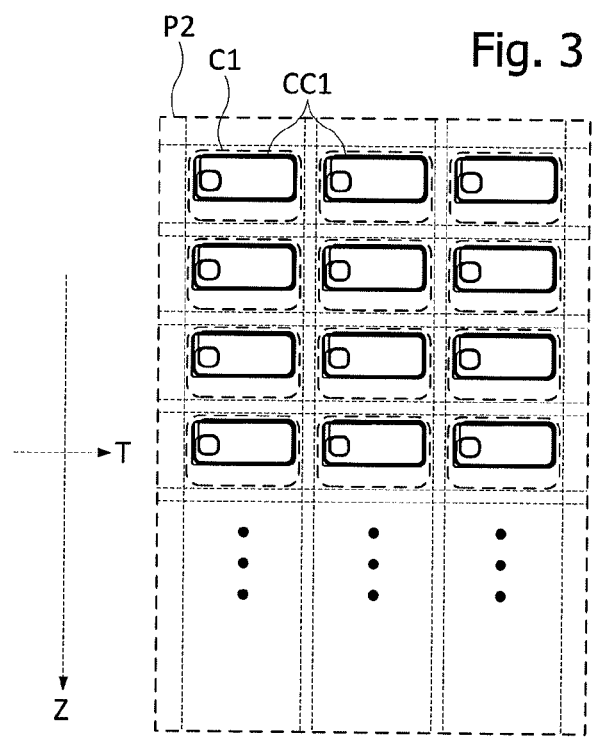

Now the manufacturing of such a microcircuit card is generally done collectively, in several steps comprising steps of forming card antenna coils in a board, and steps of cutting the board to individualize the cards. Modules, that each associate a microcircuit and an antenna coil, are implanted into the individualized cards. FIGS. 2 and 3 represent such a board, before being cut to individualize the cards. FIGS. 2 and 3 represent a rectangular board P1, P2 comprising antenna coils CC1 distributed in rows across the width of the board (along an axis T) and in columns along the length of the board (along an axis Z). FIGS. 2 and 3 also show in dotted lines the contours of the cards. In FIG. 2, the board P1 comprises four coils CC1 per row, disposed so as to form four cards C1 per row, the length of the cards being oriented along the axis Z. In FIG. 3, the board P2 comprises three coils CC1 per row, disposed so as to form three cards C1 per row, the length of the cards being oriented along the axis T. Margins are provided between the cards and between the cards and the edges of the board P1, P2. Once the antenna coils CC1 are formed, the board P1, P2 is first precut by means of pre-cut lines oriented along the axis T, then of pre-cut lines oriented along the axis Z, generally by stamping.

Even though the accuracy of the cutting out of the board P1, P2 is sufficient along the axis T, it proves insufficient along the axis Z. Indeed, the accuracy of cutting along the axis T currently reaches ±0.5 mm, whereas the accuracy of cutting along the axis Z can barely be reduced below ±1.5 mm. The result is a variation in the position of the antenna coil CC1 in relation to the edges of each card C1. Once the microcircuit M1 and its antenna coil MC1 are inserted into each card, as the cards have been individualized, the antenna coil CC1 is no longer visible. The microcircuit M1 is implanted into each card by forming a cavity in it. The position of the cavity is determined in relation to the edges of each card, and it is then not possible to easily locate the antenna of the card.

The result is a variation which can reach 3 mm (along the longitudinal or transverse axis of the card) in the positioning of the coil MC1 of the microcircuit M1, in relation to the small loop CL1 of the coil CC1 formed in the card. In a production line producing large quantities of microcircuit cards, this variation in positioning results in a significant variation, from one card to another, in the inductive coupling factor CR between the coil CC1 and the coil MC1 of the microcircuit. This variation in the inductive coupling factor occurs either along the transverse axis Y of the card (case in FIG. 2), or along the longitudinal axis X of the card (case in FIG. 3). This variation in the inductive coupling factor requires, at the end of the production line, the implementation of measurements of this coupling factor, and leads to discarding significant quantities of microcircuit cards, so as to only keep cards having substantially a given inductive coupling factor. The result is a significant increase in the manufacturing cost of such a microcircuit card.

It is thus desirable to reduce the rate of contactless microcircuit cards discarded at the end of manufacturing. For this purpose, it can be desirable to homogenize the coupling factor between the antenna coils of the card and of the microcircuit when collectively manufacturing microcircuit cards.

Some embodiments relate to a method for manufacturing a microcircuit card, comprising steps of: forming a first antenna coil in a card, the first antenna coil comprising a part following the edge of the card, forming a module comprising a microcircuit and a second antenna coil disposed around and connected to the microcircuit, and implanting the module into the card at a precise position in relation to the edge of the card, the first antenna coil being coupled by induction to the second antenna coil. The first antenna coil is pre-formed in such a way that only one part of the second antenna coil is at a distance from the first antenna coil of less than 5% of the width of the second antenna coil.

According to one embodiment, the first antenna coil is formed by depositing and etching an electrically conducting layer, or two electrically conducting layers separated by an electrically insulating layer.

According to one embodiment, the first antenna coil is formed by implanting an insulated wire into the card using ultrasounds.

According to one embodiment, the first antenna coil comprises a large loop pre-formed to partially follow the edge of the card, and a small loop comprising two first opposite parts following only one part of the edge of the second antenna coil at a distance of less than 5% of the width of the second antenna coil, and two second opposite parts spaced out from one another by a distance at least 20% greater than the distance between the first opposite parts.

According to one embodiment, the first antenna coil comprises two parallel branches located at a distance from the second antenna coil of less than 5% of the width of the second antenna coil.

According to one embodiment, the first antenna coil comprises another part susceptible of being located at a distance from the second antenna coil of less than 5% of the width of the second antenna coil, given an error margin in the positioning of the first and second antenna coils in relation to each other.

According to one embodiment, the first antenna coil comprises two adjacent branches, susceptible of being at a distance from the second antenna coil of less than 5% of the width of the second antenna coil, given an error margin in the positioning of the first and second antenna coils in relation to each other.

According to one embodiment, the method comprises a step of forming a tuning capacitor for tuning the first antenna coil, the tuning capacitor comprising two end parts of wire or conducting path forming the antenna coil, disposed opposite one another, either inside or outside the first antenna coil.

Some embodiments also relate to a method for collectively manufacturing microcircuit cards, comprising several executions of the method as defined above, to form several card antenna coils on a board (P3, P4), and a step of cutting the board to obtain cards each comprising a card antenna coil, the step of implanting a microcircuit with its antenna coil being performed in each card once individualized.

According to one embodiment, the card antenna coils are distributed in the board in rows and columns of several card antenna coils.

Some embodiments also relate to a microcircuit card comprising: a card, a first antenna coil implanted into the card, and comprising a part following the edge of the card, and a module comprising a microcircuit and a second antenna coil disposed around and connected to the microcircuit, the module being implanted into the card at a precise position in relation to the edge of the card. The first antenna coil is pre-formed in such a way that only one part of the second antenna coil is at a distance from the first antenna coil of less than 5% of the width of the second antenna coil.

According to one embodiment, the first antenna coil comprises a large loop pre-formed to partially follow the edge of the card, and a small loop comprising two first opposite parts following only one part of the edge of the second antenna coil at a distance of less than 5% of the width of the second antenna coil, and two second opposite parts spaced out from one another by a distance at least 20% greater than the distance between the first opposite parts.

According to one embodiment, the first antenna coil comprises two parallel branches located at a distance from the second antenna coil of less than 5% of the width of the second antenna coil.

According to one embodiment, the first antenna coil comprises another part susceptible of being at a distance from the second antenna coil of less than 5% of the width of the second antenna coil, given an error margin in the positioning of the first and second antenna coils in relation to each other.

According to one embodiment, the first antenna coil comprises two adjacent branches, susceptible of being at a distance from the second antenna coil of less than 5% of the width of the second antenna coil, given an error margin in the positioning of the first and second antenna coils in relation to each other.

According to one embodiment, the microcircuit card comprises a tuning capacitor for tuning the first antenna coil, the tuning capacitor comprising two end parts of wire or conducting path forming the antenna coil, disposed opposite one another, either inside or outside the first antenna coil.

Figure 4:
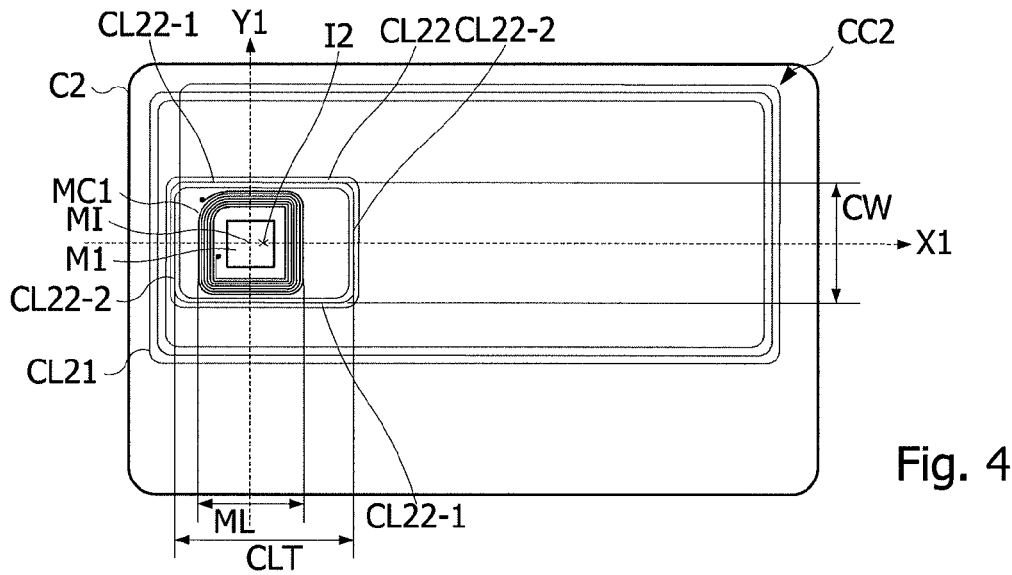
Figure 5:
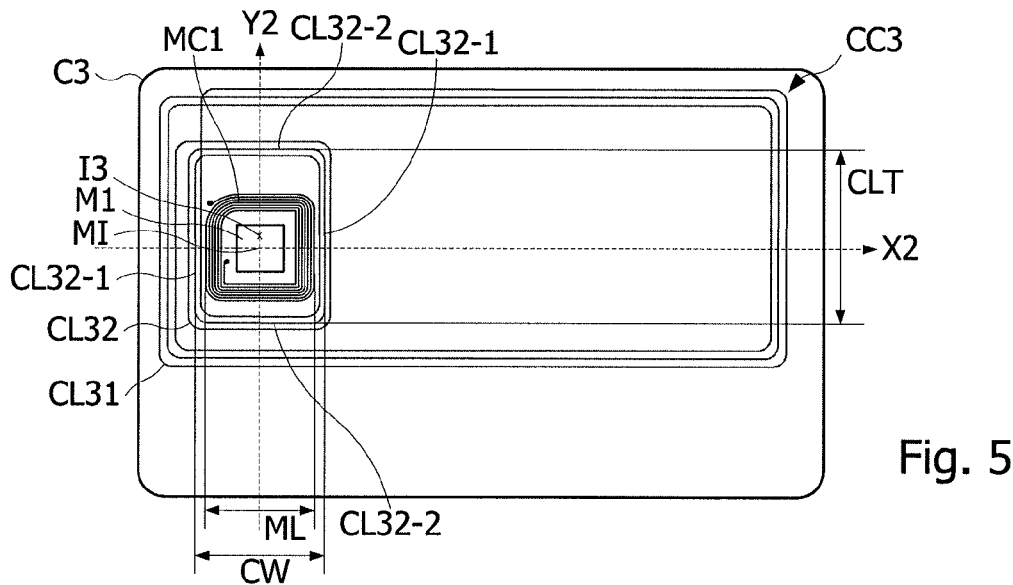
Figure 6A:
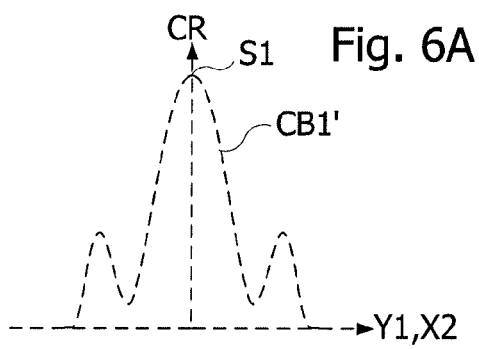
Figure 6B:
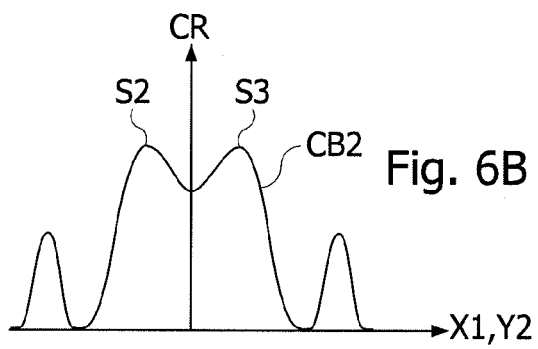
Figure 9:
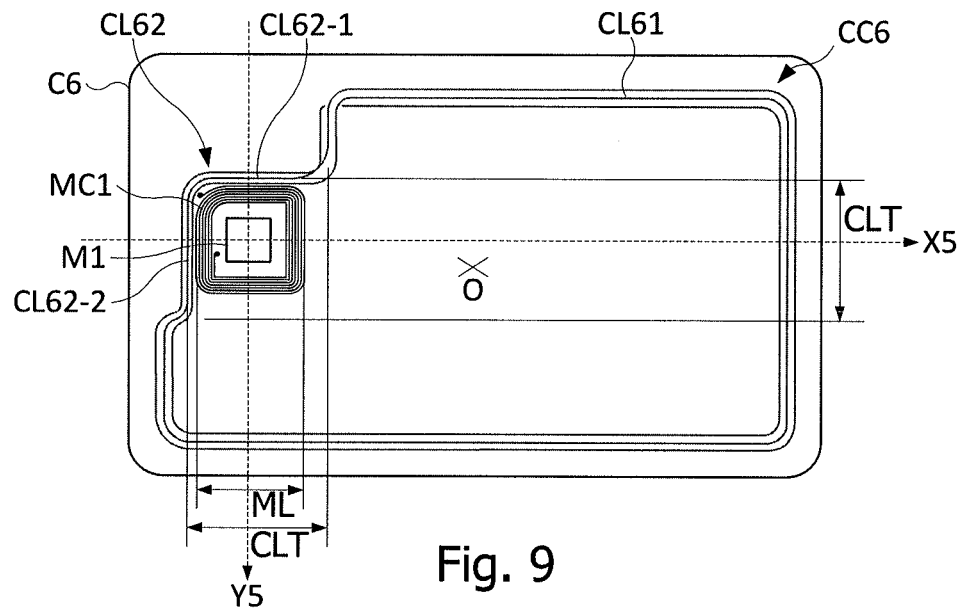
Figure 10:
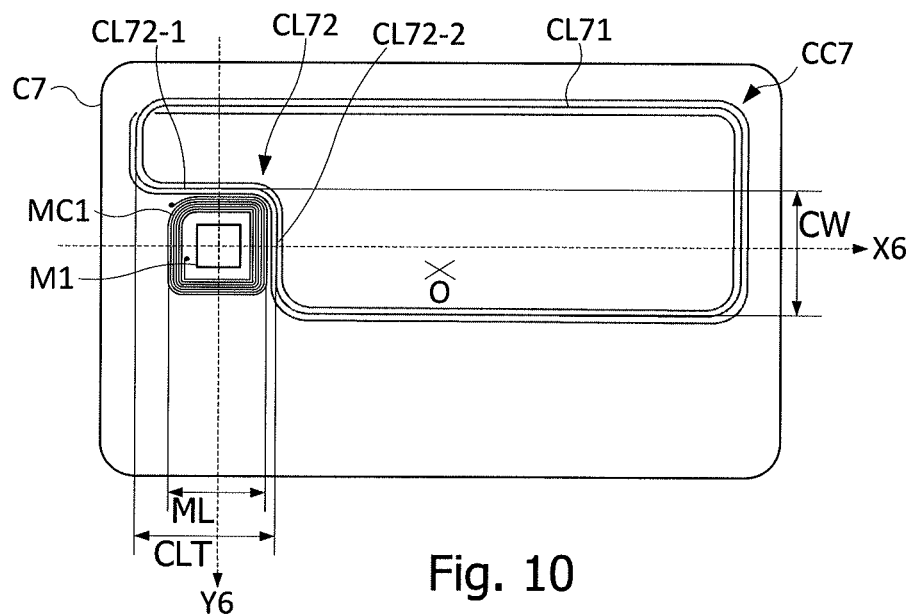
Figure 11B:
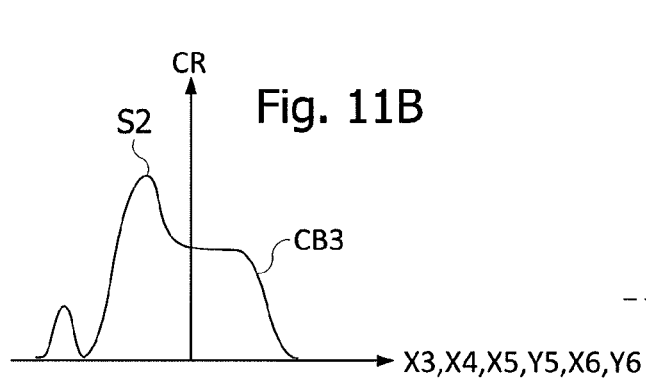
Figure 11A:
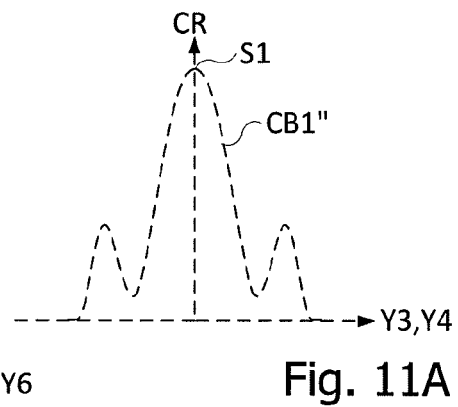
Figure 12:
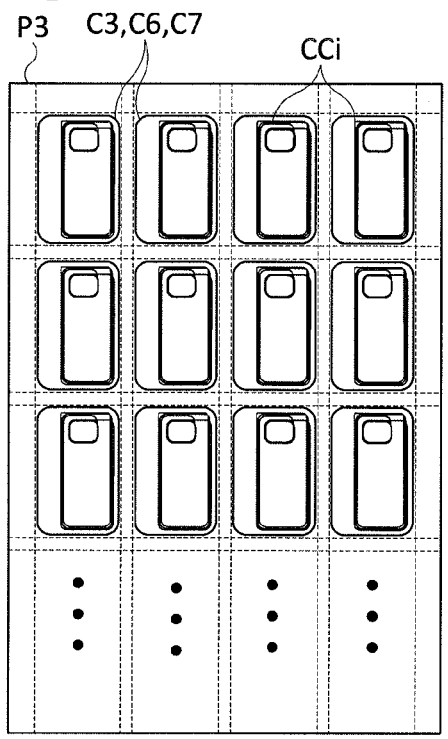
Figure 13:
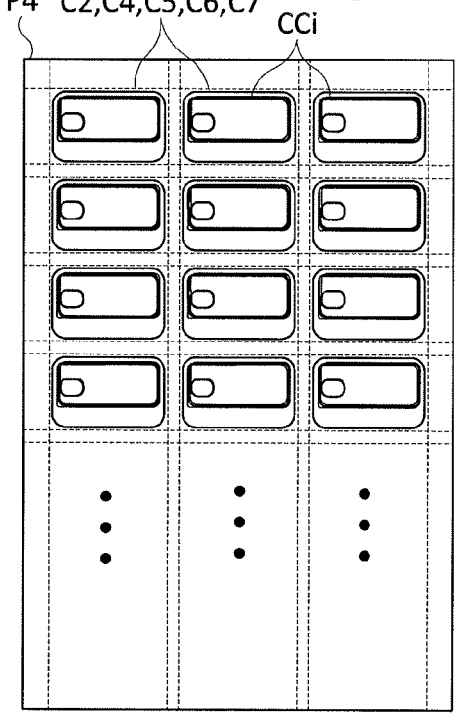
Figure 14:
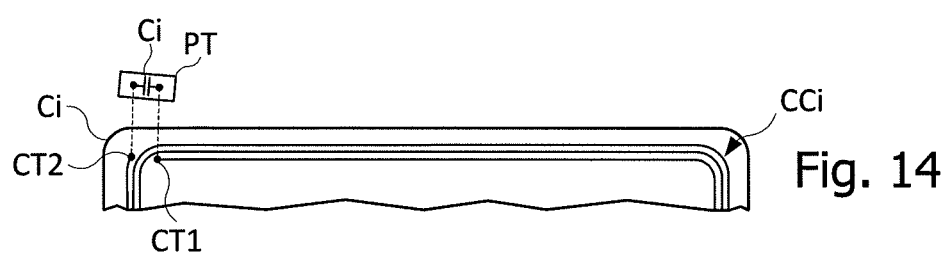
Figure 15:
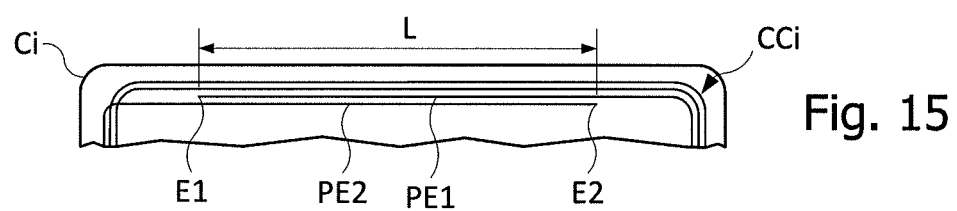
Figure 16:
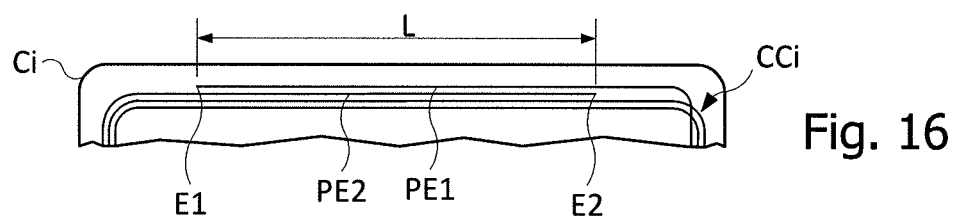

Some examples of embodiments of the present invention will be described below in relation with, but not limited to, the accompanying figures, in which:

FIG. 1 described above schematically represents a microcircuit card, according to prior art, FIG. 1A described above represents a variation curve of the inductive coupling factor between antenna coils of the card and of the contactless microcircuit, FIGS. 2 and 3 described above represent boards in which several contactless microcircuit cards are collectively formed, FIGS. 4 and 5 represent contactless microcircuit cards, according to different embodiments, FIGS. 6A, 6B represent variation curves of the coupling factor between the antenna coils of the card and of the microcircuit in FIG. 4 or 5, FIGS. 7 to 10 represent contactless microcircuit cards, according to other embodiments, FIGS. 11A, 11B represent variation curves of the coupling factor between the antenna coils of the card and of the microcircuit in FIG. 7, 8, 9 or 10, FIGS. 12 and 13 represent boards in which several contactless microcircuit cards are collectively formed, FIGS. 14 to 16 represent parts of contactless microcircuit card, according to other embodiments.

FIGS. 4 and 5 represent a contactless microcircuit card C2, C3 comprising an antenna coil CC2, CC3 and a module comprising a microcircuit M1 and an antenna coil MC1 disposed around the microcircuit and connected to the latter. Here, the term "around" does not mean that the microcircuit M1 and the coil MC1 are necessarily in a same plane. The coils CC2 or CC3 and MC1 comprise several turns, for example from 2 to 4 for the coil CC2 or CC3 and from 5 to 10 for the coil MC1. The coil CC2 or CC3 forms a large loop CL21 or CL31 and a small loop CL22 or CL32. The large loop CL21, CL31 follows the edge of the card C2, C3, or only one part of this edge as shown by FIG. 1. The large loop can thus be near the edge of the card at a minimum distance which can reach 2 to 3 mm. The antenna coil MC1 can be disposed opposite the loop CL22, CL32. In this case, the coils MC1 and CC2, CC3 are implanted into the card C2, C3 at different depths. The antenna coil MC1 can also be surrounded by the loop CL22, CL32. In this case, the coils MC1 and CC2, CC3 can also be implanted into the card C2, C3 at different depths. The coil MC1 has a round or square shape with rounded angles.

According to one embodiment, the loop CL22, CL32 has an elongated shape the length CLT of which, along an axis X1 or Y2, is 20 to 50% greater than the width CW of the loop, along an axis X2 or Y1. The width CW of the loop CL22, CL32 is between 1 and 1.1 times the external width ML of the coil MC1. Here, X1 and Y1 designate the longitudinal and transverse axes of the card C1, and X2 and Y2 designate the longitudinal and transverse axes of the card C2. Thus, the biggest sides CL22-1, CL32-1 are located at a distance from the coil MC1, of less than 5% of the width ML of the coil MC1. The length CLT of the loop CL22, CL32 may correspond to the sum of the width ML of the coil MC1 and of an error margin in the positioning of the coil CC2, CC3 in relation to the edges of the card C2, C3, if the coil MC1 can be disposed accurately in relation to the edges of the card.

In FIG. 4, the loop CL22 is elongated along the longitudinal axis X1 of the card C2. On FIG. 5, the loop CL32 is elongated along the transverse axis Y2 of the card C3. It can be noted in FIGS. 4 and 5 that the center 12, 13 of the loop CL22, CL23 does not coincide with the center M1 of the coil MC1. The small loop CL22, CL32 has an oval or rectangular shape with rounded angles. The coil MC1 can also have an oval or rectangular shape with rounded angles.

Furthermore, in the example in FIGS. 4 and 5, the large loop CL21, CL31 comprises several turns and is connected to the small loop CL22, CL32 which also comprises several turns. According to another embodiment, the coil CC2, CC3 comprises several turns each comprising a large loop and a small loop, each large loop having substantially the shape and dimensions of a turn of the large loop CL21, CL31, and being connected to a small loop of substantially the same shape and dimensions as a turn of the small loop CL22, CL32.

FIGS. 6A, 6B represent variation curves CB1', CB2 of the inductive coupling factor CR between the coils CC2 or CC3 and MC1, according to the position of the coil MC1 along the axis Y1 or X2 for the curve CB1', and along the axis X1 or Y2 for the curve CB2. The curve CB1' is substantially identical to the curve CB1 in FIG. 1A, with a main peak S1 reached when the coil MC1 is centered on the axis X1 or Y2, and secondary peaks S1', S1" when the coil MC1 is outside the loop CL22, CL32, but with a part opposite the latter. The curve CB2 has two main peaks S2, S3 which are reached when one or other of the parts of the coil MC1 extending along the axis Y1 or X2 is opposite one or other of the parts of the loop CL22, CL32 extending along this axis Y1 or X2. An area of the curve where the inductive coupling factor CR is slightly lower (by 0 to 20%) than the coupling factor corresponding to the peaks S2, S3, extends between the peaks S2 and S3. The peaks S2, S3 are lower than the peak S1 in FIG. 1A. In other words, the configuration of the loop CL22, CL32 allows for an error margin corresponding to the distance between the peaks S2 and S3, in the positioning of the coil MC1 in relation to the coil CC2, CC3, along the axis X1, Y2. Indeed, the variation in the inductive coupling factor CR between the peaks S2 and S3 remains within an acceptable limit which can be lower than 20%. On the other hand, a decrease in the coupling factor compared to the card C1 in FIG. 1 can be observed. The curve CB2 also has secondary peaks on either side of the area between the peaks S2, S3 which are reached when the coil MC1 is outside the loop CL22, CL32 with a part (vertical on FIG. 4, and horizontal on FIG. 5) opposite the loop.

FIGS. 7 to 10 represent contactless microcircuit cards C4, C5, C6, C7 according to other embodiments. The cards C4, C5, C6 comprise an antenna coil CC4, CC5, CC6, CC7, and the module comprising the microcircuit M1 connected to its antenna coil MC1. The antenna coils CC4, CC5, CC6, CC7 differ from the coils CC1 and CC2 in that they do not comprise any small loop, but a single large loop which may be made up of several turns. Each antenna coil CC4, CC5, CC6, CC7 comprises a part CL41, CL51, CL61, CL71 partially following the edge of the card C4, C5, C6, C7 at a certain distance from the edge of the card, and a part CL42, CL52, CL62, CL72 partially following the contour of the coil MC1, i.e. located at the most at a distance from the coil MC1 of less than 5% of the width ML of the coil MC1.

Figure 7:
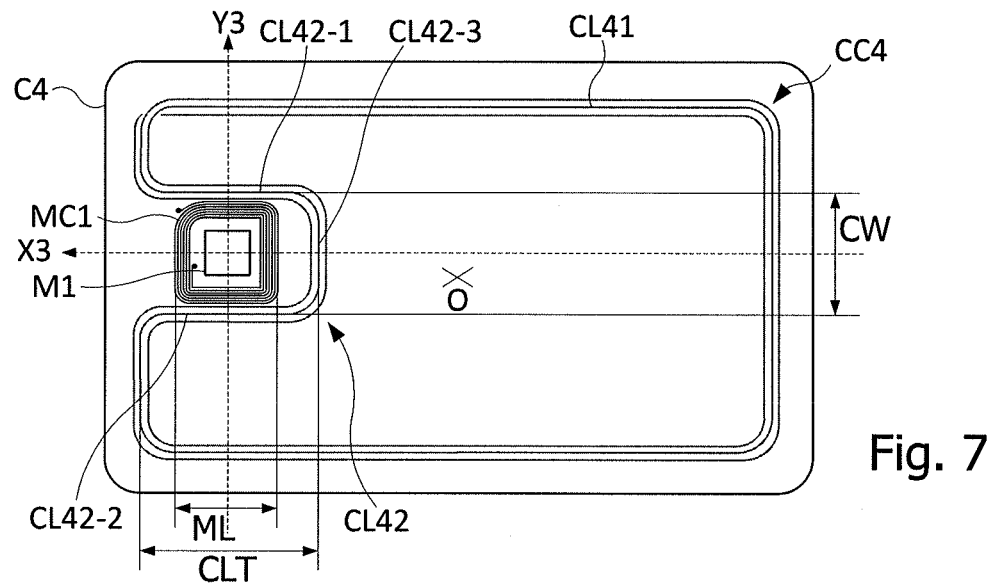

On FIG. 7, the part CL42 has the shape of a U, comprising two branches CL42-1, CL42-2 and a base CL42-3 passing between the coil MC1 and the center O of the card C4. The branches CL42-1, CL42-2 are attached by their peak to the part CL41 in the vicinity of the edge of the card C4 closest to the coil MC1, extending along the transverse axis Y3 of the card. The coil MC1 is thus outside the coil CC4. The space between the branches CL42-1, CL42-2 substantially corresponds to the width ML of the coil MC1: the branches CL42-1, CL42-2 are located at a distance from the coil MC1 of less than 5% of the width ML of the coil MC1. The length CLT of the branches CL42-1, CL42-2 is at least 20% greater than the space between the branches CL42-1, CL42-2, for example by 20 to 50% of this space. The length CLT of the branches CL42-1, CL42-2 may correspond to or be greater than the sum of the width ML of the coil MC1 and of an error margin in the positioning of the coil CC4 in relation to the edges of the card C4, and in particular in relation to the edges extending along the longitudinal axis Y3 of the card.

Figure 8:
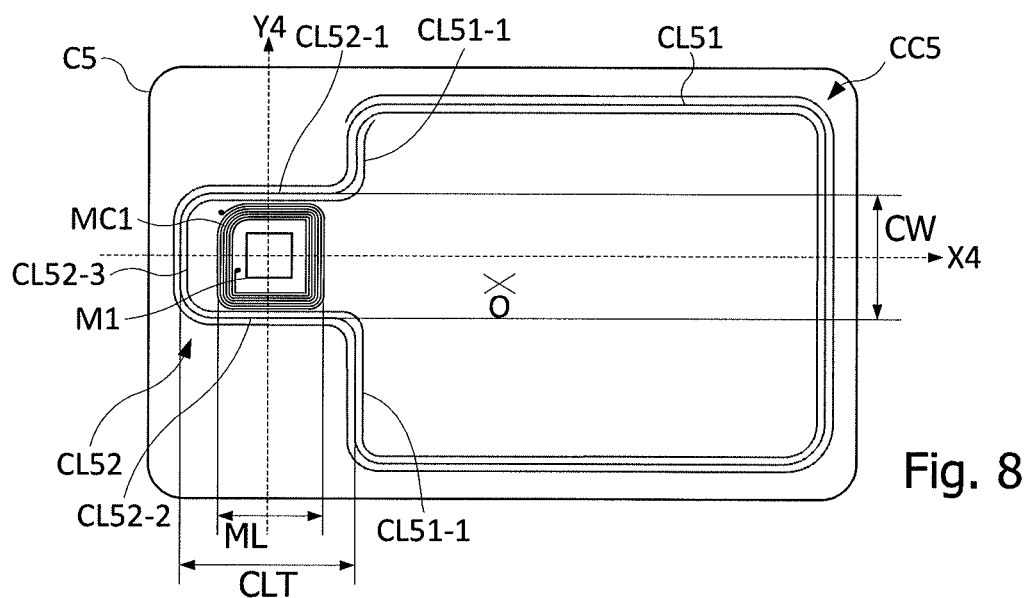

On FIG. 8, the part CL51 of the coil CC5 comprises a part CL51-1 parallel to the transverse axis Y4 of the card C5, and passing between the coil MC1 and the center O of the card C5. The part CL52 of the coil C5, partially following the contour of the coil MC1, also has the shape of a U with two branches CL52-1, CL52-2 attached by their peak to the part CL51-1 passing between the coil and the center O of the card C5, and a base CL52-3 disposed between the edge of the card C5 and the coil MC1. The coil MC1 is thus surrounded by the coil CC5. Here again, the space between the branches CL52-1, CL52-2 substantially corresponds to the width ML of the coil MC1: the branches CL52-1, CL52-2 are located at a distance from the coil MC1 of less than 5% of the width ML of the coil MC1. The length CLT of the branches CL52-1, CL52-2 is at least 20% greater than the space between the branches CL52-1, CL52-2, for example by 20 to 50% of this space. The length CLT of the branches CL52-1, CL52-2 may correspond to or be greater than the sum of the width ML of the coil MC1 and of an error margin in the positioning of the coil CC5 in relation to the edges of the card C5, and in particular in relation to the edges extending along the longitudinal axis Y4 of the card.

On FIG. 9, the part CL61 of the coil CC6 extends along the edges of the card C6, except for an angle of the card near the coil MC1. The part CL62 partially following the contours of the coil MC1 comprises two adjacent branches CL62-1, CL62-2. The branch CL62-1 is parallel to an edge of the coil MC1 extending along the longitudinal axis X5 of the card C6. The branch CL62-2 is parallel to an edge of the coil MC1 extending along the transverse axis Y5 of the card C6 and is disposed between the coil MC1 and the edge of the card closest to the coil MC1. The parts CL62-1 and CL62-2 close the part CL61 to form the coil CC6. The coil MC1 is surrounded by the coil CC6. One and/or the other of the branches CL62-1, CL62-2 is situated at a distance from the coil MC1 of less than 5% of the width ML of the coil MC1. One and/or the other of the branches CL62-1, CL62-2 can have a length CLT at least 20% greater than the width ML of the coil MC1, for example by 20 to 50% of this width. The length CLT of one and/or the other of the branches CL62-1, CL62-2 may correspond to the sum of the width ML of the coil MC1 and of an error margin in the positioning of the coil CC6 in relation to the edges of the card C6, and in particular in relation to the edges extending along the longitudinal axis X5 (for the branch CL62-1) and/or transverse axis Y5 of the card (for the branch CL62-2).

On FIG. 10, the part CL71 of the coil CC5 extends along the edges of the card C7, except for another angle of the card near the coil MC1. The part CL72 partially following the contours of the coil MC1, comprises two adjacent branches CL72-1, CL72-2. The branch CL72-1 is parallel to an edge of the coil MC1 extending along the longitudinal axis X6 of the card C7. The branch CL72-2 is parallel to an edge of the coil MC1 extending along the transverse axis Y6 of the card C7, and is disposed between the coil MC1 and the center O of the card C7. The parts CL72-1 and CL72-2 close the part CL71 to form the coil CC7. The coil MC1 is outside the coil CC7. One and/or the other of the branches CL72-1, CL72-2 is situated at a distance from the coil MC1 of less than 5% of the width ML of the coil MC1. One and/or the other of the branches CL72-1, CL72-2 can have a length CLT at least 20% greater than the width ML of the coil MC1, for example by 20 to 50% of this width. The length CLT of one and/or the other of the branches CL72-1, CL72-2 may correspond to the sum of the width ML of the coil MC1 and of an error margin in the positioning of the coil CC7 in relation to the edges of the card C7, and in particular in relation to the edges extending along the longitudinal axis X6 (for the branch CL72-1) and/or transverse axis Y6 of the card (for the branch CL72-2). In the example in FIG. 10, a part of the coil CC7 is far from the edge of the card. The part of the card outside the coil CC7 (and CC2 and CC3) can be provided to receive inscriptions formed by embossing, such as a card number, and the first and last names of the card holder.

FIGS. 11A, 11B represent variation curves CB1" and CB3 of the inductive coupling factor CR between the coils CC4, CC5, CC6 or CC7 and MC1, according to the coil MC1 along the axis Y3 or Y4 in relation to the card, for the curve CB1", and along the axis X3, X4, X5, Y5, X6 or Y6 for the curve CB3. The curve CB1" is substantially identical to the curve CB1 in FIG. 1A. The curve CB3 has a single main peak S2 that is reached when one or other of the parts of the coil MC1 extending along the axis X3, X4, X5, Y5, X6 or Y6 is opposite one or other of the branches CL42-3, CL52-3, CL62-1, CL62-2, CL72-1 or CL72-2. An area of the curve where the inductive coupling factor CR remains slightly lower (by 0 to 20%) than the coupling factor corresponding to the peak S2 extends on the right of the peak S2. The peak S2 is lower than the peak S1 in FIG. 1A. In other words, the configuration of the coils CC4, CC5, CC6, CC7 allows for an error margin in the positioning of the coil MC1 in relation to the coil CC4, CC5, CC6, CC7 along the axis X3, X4, X5, Y5, X6, Y6. This error margin corresponds to the range of positions of the coil MC1 along this axis, where the coupling factor CR remains greater than 20% of the value of this factor at the peak S2. A secondary peak which appears when the coil MC1 has nearly completely changed location—inside/outside the coil CC4-CC7, but with a part opposite the coil CC4-CC7—is found to the left of the peak S2.

The parts CL42-3 (FIG. 7) and CL52-3 (FIG. 8) can be disposed sufficiently far from the area susceptible of being occupied by the antenna coil of the microcircuit, so as to never be opposite the latter. In this way, the coupling factor CR has no main peak S2, and thus remains substantially constant even though the position of the coil of the microcircuit varies in relation to the coil of the card, within the limit of the error margin described above, in the positioning of the coil of the microcircuit in relation to the coil of the card.

In the embodiments presented in FIGS. 4, 5 and 7 to 10, the antenna coil of the card follows only a portion of the contour of the coil of the microcircuit. In FIGS. 4, 5, 7 and 8, the proportion of the coil of the microcircuit covered or followed by the coil of the card represents between half and three quarters of the contour of the coil of the microcircuit, given the error margin in the positioning of the coil of the microcircuit in relation to the coil of the card. In FIGS. 9 and 10, this proportion is situated between one quarter of and half the contour of the coil of the microcircuit.

According to one embodiment, the cards C2 to C7 are collectively manufactured in polymer resin boards (PVC, PC or PET). Thus, FIGS. 12 and 13 represent boards P3, P4 in which antenna coils CCi are collectively formed. The boards P3, P4 differ from the boards P1, P2 only by the shape of the card antenna coils and by the way they are formed. On FIG. 12, the longitudinal axes X1-X5 of the cards are parallel to the longitudinal axis Z of the board P3. On FIG. 13, the longitudinal axes X1-X5 of the cards are parallel to the transverse axis T of the board P4. On FIGS. 12 and 13, the loops CL22 or CL32, or the parts CL42, CL52 are formed with their longitudinal axis X1, Y2, X3, X4 following the direction T or Z having the highest error margin in the positioning of the coils CC2-CC5 and MC1 in relation to each other. Thus, if this error margin is greater along the transverse axis T than along the longitudinal axis Z of the boards P3, P4, the antenna coil CC3 can be formed on the board P3, whereas the coils CC2, CC4 and CC5 can be formed on the board P4. The antenna coils CC6 and CC7 can be formed indifferently on the boards P3 and P4.

According to one embodiment, the coils CC2 to CC7 are collectively produced by depositing on a board (for example P3 or P4) and etching two electrically conducting layers and an electrically insulating layer between the two conducting layers, to form conducting paths which may cross.

According to another embodiment, the coils CC2 to CC7 are collectively produced using a wire insulated in a sheath or by means of a varnish, which is gradually pushed into the card using ultrasounds capable of locally melting the card. The insulated wire is thus unwound following the route of the wire forming the turns of the coil to be formed. The wire may have a diameter of 50 to 150 μm. The spacing pitch between the turns may be of 150 to 500 μm.

According to one embodiment, the coils CC2 to CC7 are closed up to form a closed circuit, by a capacitor the capacitance of which is chosen to tune the coil to the desired resonance frequency. FIG. 14 represents a part of the card Ci (i=2, 3, 4, 5, 6 or 7) with a part of the antenna coil CCi (i=2, 3, 4, 5, 6 or 7) of the card. The ends of the conducting path or of the wire forming the coil comprise contact pads CT1, CT2 whereby it is possible to connect a capacitor C formed on a wafer PT. The coils CC4 to CC7 may thus be formed without crossing, the capacitor C closing the circuit of the coil. The coils CC4 to CC7 may thus be formed by etching a single electrically conducting layer.

According to another embodiment, the coils CC2 to CC7 are not closed up, but have end parts forming a capacitor. FIGS. 15 and 16 represent a part of the card Ci (i=2, 3, 4, 5, 6 or 7) and in particular the end parts PE1, PE2 of the wire or of the conducting path forming the coil CCi (i=2, 3, 4, 5, 6 or 7). The end parts PE1, PE2 are disposed in parallel to each other and opposite one another over a certain length L, and thus form the electrodes of a capacitor. The length L thus represents the distance between the two ends E1, E2 of the wire or of the conducting path forming the coil CCi. The capacitance of the capacitor thus formed and thus the resonance frequency of the coil CCi, may thus be set by adjusting the length L, given the space between the parts PE1, PE2, and the thickness of each of the parts PE1, PE2. On FIG. 15, the parts PE1, PE2 are located inside the coil CCi, whereas on FIG. 16, they are located outside the coil CCi. It can be desirable to maximize the size of the coil CCi. In this case, it is preferable to form the capacitor (PE1, PE2) inside the coil CCi as shown by FIG. 15.

It will be understood by those skilled in the art that the present invention is susceptible of various alternative embodiments and various applications. In particular, the invention is not limited to the shapes of microcircuit or card antenna coils presented, but can apply to other shapes, provided that the card antenna coil comprises a part close to the edge of the card and that the antenna coil of the microcircuit has a part close to and a part further away from the antenna coil of the card. The present invention is not limited either to cards having the format defined by the ISO 7816 standard.

Furthermore, the formation of the tuning capacitor using the electrodes PA1, PA2 can be applied to any microcircuit card comprising a card antenna coil coupled by induction with an antenna connected to the microcircuit, or directly connected to the microcircuit.

The invention claimed is:

1. A method for manufacturing a microcircuit card, comprising steps of:
    forming a first antenna coil in a card, the first antenna coil comprising a part following the edge of the card,
    forming a module comprising a microcircuit and a second antenna coil disposed around and connected to the microcircuit, and
    implanting the module into the card at a precise position in relation to the edge of the card, the first antenna coil being coupled by induction to the second antenna coil,
    wherein the first antenna coil is pre-formed in such a way that only one part of the second antenna coil is at a distance from the first antenna coil of less than 5% of the width of the second antenna coil.

2. Method according to claim 1, wherein the first antenna coil is formed by depositing and etching an electrically conducting layer, or two electrically conducting layers separated by an electrically insulating layer.

3. Method according to claim 1, wherein the first antenna coil is formed by implanting an insulated wire into the card using ultrasounds.

4. Method according to claim 1, wherein the first antenna coil comprises a large loop pre-formed to partially follow the edge of the card, and a small loop comprising two first opposite parts following only one part of the edge of the second antenna coil at a distance of less than 5% of the width of the second antenna coil, and two second opposite parts spaced out from one another by a distance at least 20% greater than the distance between the first opposite parts.

5. Method according to claim 4, wherein the first antenna coil comprises another part susceptible of being located at a distance from the second antenna coil of less than 5% of the width of the second antenna coil, given an error margin in the positioning of the first and second antenna coils in relation to each other.

6. Method according to claim 1, wherein the first antenna coil comprises two parallel branches located at a distance from the second antenna coil of less than 5% of the width of the second antenna coil.

7. Method according to claim 1, wherein the first antenna coil comprises two adjacent branches, susceptible of being at a distance from the second antenna coil of less than 5% of the width of the second antenna coil, given an error margin in the positioning of the first and second antenna coils in relation to each other.

8. Method according to claim 1, comprising a step of forming a tuning capacitor for tuning the first antenna coil, the tuning capacitor comprising two end parts of wire or conducting path forming the antenna coil, disposed opposite one another, either inside or outside the first antenna coil.

9. A method for collectively manufacturing microcircuit cards, comprising several executions of the method according to claim 1, to form several card antenna coils on a board, and a step of cutting the board to obtain cards each comprising a card antenna coil, the step of implanting a microcircuit with its antenna coil being performed in each card once individualized.

10. Method according to claim 9, wherein the card antenna coils are distributed in the board in rows and columns of several card antenna coils.

11. A microcircuit card comprising:
    a card,
    a first antenna coil implanted into the card, and comprising a part following the edge of the card, and
    a module comprising a microcircuit and a second antenna coil disposed around and connected to the microcircuit, the module being implanted into the card at a precise position in relation to the edge of the card,
    wherein the first antenna coil is shaped in such a way that only one part of the second antenna coil is at a distance from the first antenna coil of less than 5% of the width of the second antenna coil.

12. Microcircuit card according to claim 11, wherein the first antenna coil comprises a large loop shaped to partially follow the edge of the card, and a small loop comprising two first opposite parts following only one part of the edge of the second antenna coil at a distance of less than 5% of the width of the second antenna coil, and two second opposite parts spaced out from one another by a distance at least 20% greater than the distance between the first opposite parts.

13. Microcircuit card according to claim 12, wherein the first antenna coil comprises another part susceptible of being at a distance from the second antenna coil of less than 5% of the width of the second antenna coil, given an error margin in the positioning of the first and second antenna coils in relation to each other.

14. Microcircuit card according to claim 11, wherein the first antenna coil comprises two parallel branches located at a distance from the second antenna coil of less than 5% of the width of the second antenna coil.

15. Microcircuit card according to claim 11, wherein the first antenna coil comprises two adjacent branches, susceptible of being at a distance from the second antenna coil of less than 5% of the width of the second antenna coil, given an error margin in the positioning of the first and second antenna coils in relation to each other.

16. Microcircuit card according to claim 11, comprising a tuning capacitor for tuning the first antenna coil, the tuning capacitor comprising two end parts of wire or conducting path forming the antenna coil, disposed opposite one another, either inside or outside the first antenna coil.

\* \* \* \* \*